United States Patent
Pavlath

[19]

[11] Patent Number: 5,933,564
[45] Date of Patent: Aug. 3, 1999

[54] OPTICAL INTERCONNECTION APPARATUS

[75] Inventor: George A. Pavlath, Thousand Oaks, Calif.

[73] Assignee: Litton Systems, Inc., Woodland Hills, Calif.

[21] Appl. No.: 08/562,160

[22] Filed: Nov. 22, 1995

[51] Int. Cl.[6] .............................. G02B 6/00; G02B 6/38
[52] U.S. Cl. ............................ 385/139; 385/59; 385/65; 385/76; 385/83; 385/98; 385/99
[58] Field of Search ................................. 385/76, 80, 83, 385/95, 96, 98, 99, 134, 135, 139, 59, 60, 65, 52

[56] References Cited

U.S. PATENT DOCUMENTS

| | | | |
|---|---|---|---|
| 4,146,301 | 3/1979 | Cherin et al. ............................ | 385/59 |
| 4,173,389 | 11/1979 | Curtis . | |
| 4,277,135 | 7/1981 | Schrott et al. ............................ | 385/59 |
| 4,385,801 | 5/1983 | Bubanko ................................ | 385/59 |
| 4,653,845 | 3/1987 | Tremblay et al. ........................ | 385/46 |
| 4,721,586 | 1/1988 | Kakii et al. .............................. | 264/1.5 |
| 4,772,087 | 9/1988 | Ito . | |
| 4,778,243 | 10/1988 | Finzel ...................................... | 385/71 |
| 5,134,470 | 7/1992 | Ravetti . | |
| 5,155,781 | 10/1992 | Doss et al. . | |
| 5,155,785 | 10/1992 | Holland et al. .......................... | 385/89 |
| 5,183,489 | 2/1993 | Brehm et al. ............................ | 385/98 |
| 5,204,925 | 4/1993 | Bonanni et al. .......................... | 385/76 |
| 5,371,820 | 12/1994 | Welbourn et al. ....................... | 385/139 |
| 5,381,506 | 1/1995 | Amick et al. ............................ | 385/114 |
| 5,416,872 | 5/1995 | Sizer, II et al. .......................... | 385/92 |
| 5,513,293 | 4/1996 | Holland et al. .......................... | 385/135 |
| 5,568,576 | 10/1996 | Takai et al. .............................. | 385/23 |
| 5,687,266 | 11/1997 | Leyssens et al. ........................ | 385/59 |

FOREIGN PATENT DOCUMENTS

| | | |
|---|---|---|
| 0 278 423 | 8/1988 | European Pat. Off. . |
| 0 290 188 | 11/1988 | European Pat. Off. . |
| 0 622 651 A1 | 11/1994 | European Pat. Off. . |
| 0 642 043 A1 | 3/1995 | European Pat. Off. . |
| 2 403 572 | 4/1979 | France . |
| 29 30 831 A1 | 3/1981 | Germany . |
| 60-194412 | 10/1985 | Japan . |

OTHER PUBLICATIONS

Schroeder, J. E. et al., Optical Interconnection and Packaging Technologies for Advanced Avionics Systems, Proceedings of the National Aerospace and Electronics Conference, Dayton, May 18–22, 1992, vol. 1 of 3, May 18, 1992, IEEE, pp. 207–211.

*Primary Examiner*—Hemang Sanghavi
*Attorney, Agent, or Firm*—Robert E. Malm

[57] ABSTRACT

The optical interconnection apparatus includes one or more terminator blocks which hold a plurality of jacketed optical fibers and a flexible matrix which encloses the jacketed optical fibers and partially surrounds the terminator blocks so as to anchor the terminator blocks within the matrix. Each terminator block comprises a jacket holder and a jacket clamp. The jacket holder has a surface with a plurality of grooves for receiving a plurality of jacketed optical fibers. The jacket clamp clamps a plurality of jacketed optical fibers in the plurality of grooves of a jacket holder. The terminator blocks are used with a mold having one or more guide structures for use in guiding each of the terminator blocks into the mold, a terminator block having one or more guide followers which engage and follow the guide structures of the mold when the terminator block is inserted into the mold. The optical interconnection apparatus further comprises one or more connector blocks, each of which is attachable to two terminator blocks. The connector block holds the bare optical fibers protruding from a terminator block when the connector block is attached to the terminator block and bare optical fibers are protruding from the terminator block. Each connector block comprises a fiber holder and a fiber clamp. The fiber holder has a surface with a plurality of grooves dimensioned to receive a plurality of bare optical fibers. The fiber clamp provides the means for clamping the bare optical fibers in the grooves of a fiber holler.

35 Claims, 4 Drawing Sheets

OPTICAL INTERCONNECTION APPARATUS

BACKGROUND OF THE INVENTION

This invention relates generally to methods and apparatus for interconnecting optical and opto-electronic devices which involve the transmission of light rather than electronic signals.

In the last few years a few fiber-optic systems have transitioned into production. Two examples are the fiber-optic gyro (FOG) and the fiber-optic amplifier. These systems are composed of many-fiber optic and fiber-pigtailed components which must be locally assembled into a continuous optical circuit for these products to function. The assembly process of choice is fusion splicing. Fusion splicing provides an optically low loss and mechanically secure process for connecting fiber ends together to form a continuous optical path. Fusion splicing has been successfully adopted by industry as evidenced by the fact that the United States fiber-optic telephone system is connected exclusively by fusion splices.

Today, fusion splices are performed semi-manually. The fiber ends are mechanically stripped of their jackets, mechano-chemically cleaned, mechanically cleaved, manually inserted into the fusion splicer which automatically makes the splice, manually removed and manually rejacketed and reinforced, and finally the splice and its associated service loops (required to perform the above operations) are manually stored in an appropriate holder. While this semi-manual approach was cost effective for assembling the telephone system, it is not cost effective for manufacturing thousands of fiber-optic systems per year. This has been recognized by the government, and manufacturing technology programs have been started which seek to improve yield by reducing process variability and by automating the entire fusion splicing process except for the storage of the finished splice. When these programs are successfully completed, a cost effective fusion splicing process for assembling these fiber-optic systems will be available to industry.

The automatic fusion splicing process will still be a point-to-point, serial process. The achievement of further cost improvements in the assembly of fiber systems will require a new paradigm. What is needed is a parallel process which can interconnect many of the fibers in a fiber system at once, which does not require the storage of the finished connection, and which does not need service loops thus eliminating the manual operation of storing them. This process would be repeated at most a few times to assemble the entire fiber-optic system, both optically and mechanically.

SUMMARY OF THE INVENTION

The optical interconnection apparatus comprises one or more terminator blocks which hold a plurality of jacketed optical fibers and a flexible matrix which encloses the jacketed optical fibers and partially surrounds the terminator blocks so as to anchor the terminator blocks within the matrix. Each terminator block comprises a jacket holder and a jacket clamp. The jacket holder has a surface with a plurality of grooves for receiving a plurality of jacketed optical fibers. The jacket clamp clamps a plurality of jacketed optical fibers in the plurality of grooves of a jacket holder. One or more of the external surfaces of each terminator block have projections which serve to anchor the terminator block within the matrix that encloses a portion of the terminator block.

The terminator blocks are used with a mold having one or more guide structures for use in guiding each of the terminator blocks into the mold, a terminator block having one or more guide followers which engage and follow the guide structures of the mold when the terminator block is inserted into the mold. A mold cover is used when the fiber connection matrix is formed by an injection molding process. The terminator blocks are held immoveable within the mold by the mold, the mold cover, the one or more guide structures, and the one or more guide followers when the mold cover is placed on the mold.

A jacket clamp is attachable to a jacket holder with one or more latches. In one embodiment of the invention, a jacket clamp can be latched to a jacket holder in a first and a second position. When the jacket clamp is latched in the first position, a plurality of optical fibers can be threaded through the grooves of the jacket holder. When the jacket clamp is latched in the second position, the optical fibers are clamped in the grooves.

The optical interconnection apparatus further comprises one or more connector blocks, each of which is attachable to two terminator blocks. The connector block holds the bare optical fibers protruding from a terminator block when the connector block is attached to the terminator block and bare optical fibers are protruding from the terminator block.

Each connector block comprises a fiber holder and a fiber clamp. The fiber holder has a surface with a plurality of grooves dimensioned to receive a plurality of bare optical fibers. The fiber clamp provides the means for clamping the bare optical fibers in the grooves of a fiber holder.

DESCRIPTION OF THE PREFERRED EMBODIMENT

Fiber-optic systems comprising devices such as fiber-optic gyros and fiber-optic amplifiers are currently interconnected optically using the industry-standard fusion splicing process. The fusion splicing process is a serial, point-to-point process; i.e. one splice is made at a time and the splice connects one component at a point in the system to another component at a different point.

Figure 1:
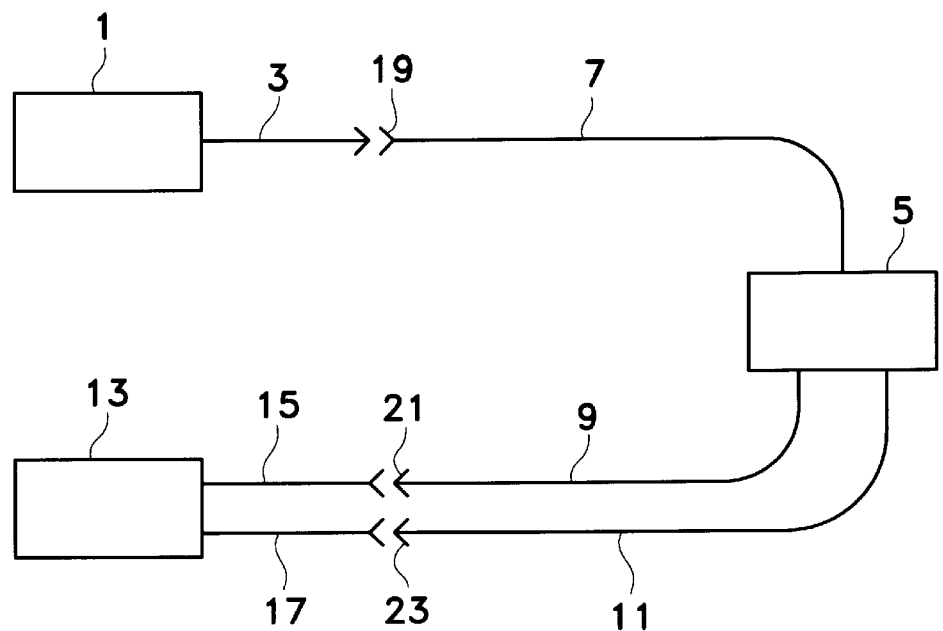
FIG. 1 shows the prior art approach to connecting optical components with optical fibers.

The conceptual basis for the prior art is illustrated in FIG. 1 for a three-component fiber-optic system. Component 1 is shown with input/output fiber 3, component 5 with input/output fibers 7, 9, and 11, and component 13 with input/output fibers 15 and 17. The optical connections between the components are accomplished with splices 19, 21, and 23. In the prior art, a minimum "service loop" typically ranging from 20 to 40 cm is required between each component and its connecting splice. These service loops are required with present-day fusion splices to enable the fiber ends to be loaded into the splicer while the components are resting on the assembly bench. The subsequent storage of these service loops is time consuming and also frequently results in breaks which reduce yields and drive up costs.

Figure 2:
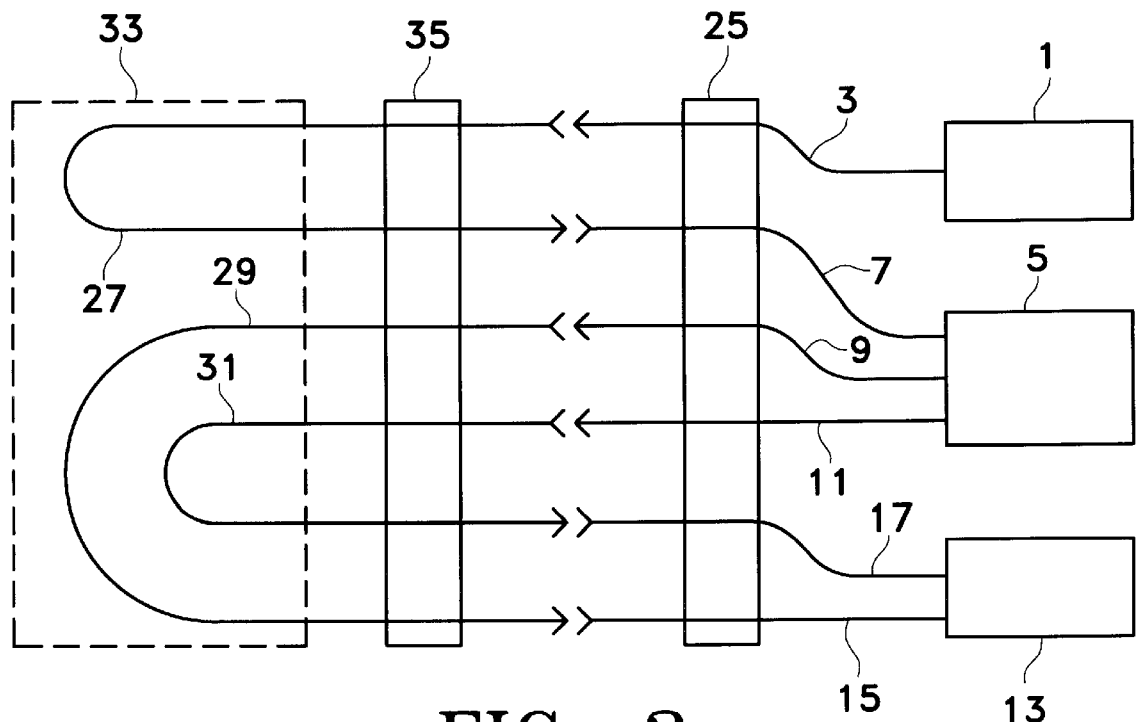
FIG. 2 shows the conceptual basis for the present invention.

The conceptual basis for the present invention is illustrated in FIG. 2 for the same three-component system. The ends of the six fibers 3, 7, 9, 11, 15, and 17 from components 1, 5, and 13 are secured in terminator block 25. Connecting fibers 27, 29, and 31 are secured in a fiber connection matrix 33 and the ends of the fibers are secured in terminator block 35. Terminator blocks 25 and 35 are so constructed that the component fibers are properly aligned for splicing when the terminator blocks are brought together. The actual joining of the fibers is accomplished either with a batch fusion splicing process or by using a suitable adhesive.

The prior-art process of FIG. 1 uses three sequential joining operations while the process of FIG. 2 uses one parallel joining operation. The fiber connection matrix is fabricated in a two-dimensional configuration, but can be bent into a three-dimensional configuration such that after the fiber ends are joined together, the fiber connection matrix and the three components form a compact integrated package. In this way, the storage process associated with the service loops of the prior art is avoided.

Figure 3:
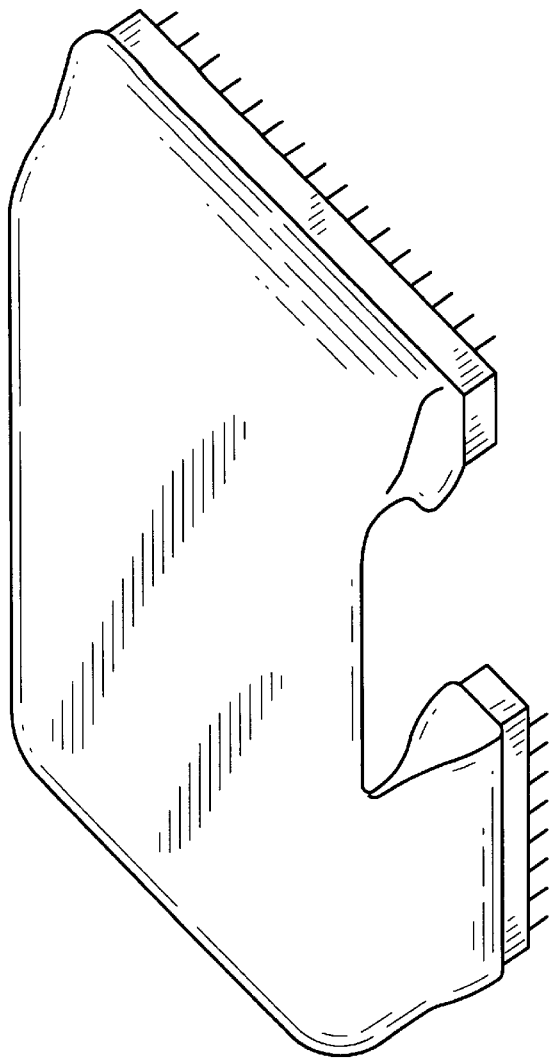
FIG. 3 shows a three-dimensional configuration of the fiber connection matrix.

The fiber connection matrix may be a simple, essentially two-dimensional structure as suggested in FIG. 2 or a three-dimensional structure as shown in FIG. 3. The structure of FIG. 3 allows the fiber connection matrix to be close to the components which it interconnects thereby permitting the interconnected components to be packaged together in a compact manner.

The fabrication of a fiber connection matrix having either the two- or three-dimensional structure can be accomplished with a two-dimensional mold. The matrix which surrounds the optical fibers being held in the terminator blocks should be made of a material which is flexible after curing so that the matrix can be bent into a three-dimensional configuration.

Figure 4:
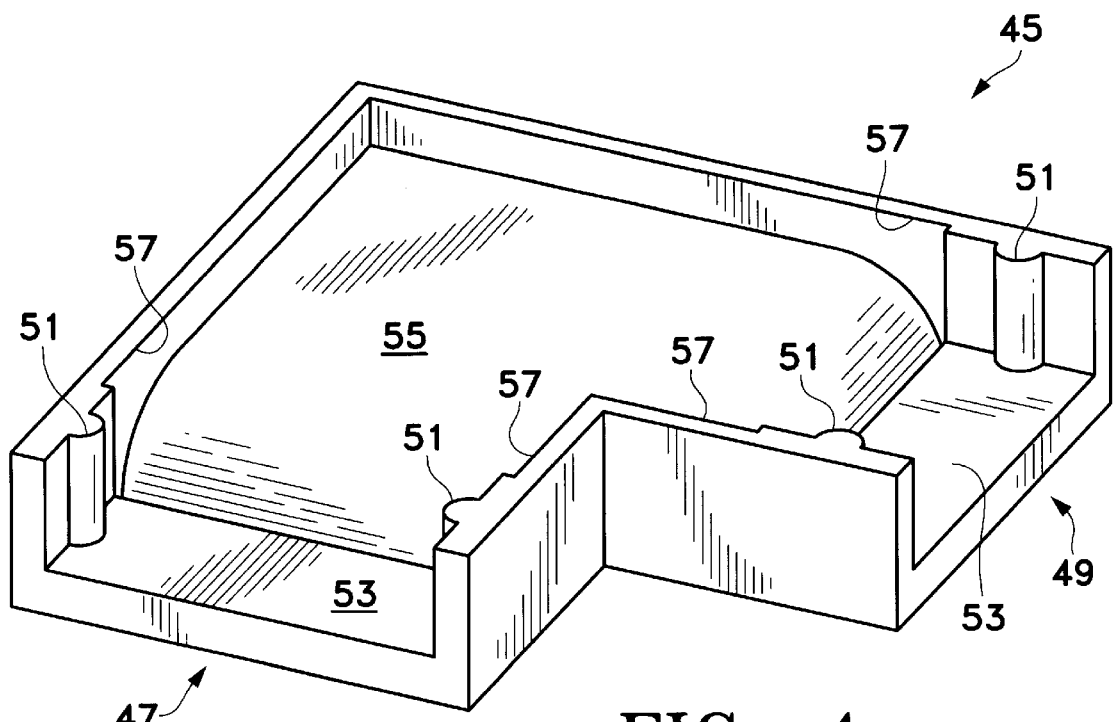
FIG. 4 shows a mold for use in molding the fiber connection matrix.

The mold for the structure of FIG. 3 is shown in FIG. 4.

The L-shaped mold 45 has two openings 47 and 49 to accept terminator blocks. In order to provide a means for inserting the terminator blocks into the mold and holding them there during the molding operation, guide structures are provided in the openings 47 and 49 of the mold 45, and guide followers, which can engage and follow the guide structures, are incorporated in the terminator blocks. The columns 51 shown in FIG. 4 are the preferred embodiment for aligning and holding the terminator blocks in the mold.

The sills 53 hold the terminator blocks above the floor 55 of the mold. The terminator blocks extend beyond the sills 53 over the floor 55 thereby providing space for the molding material to flow under the terminator blocks and anchor the terminator blocks within the matrix formed when the molding material cures. The indentations 57 in the walls of the mold 45 provide space for the molding material to flow between the mold walls and the sides of the terminator blocks so as to further anchor the terminator blocks to the matrix.

Figure 5:
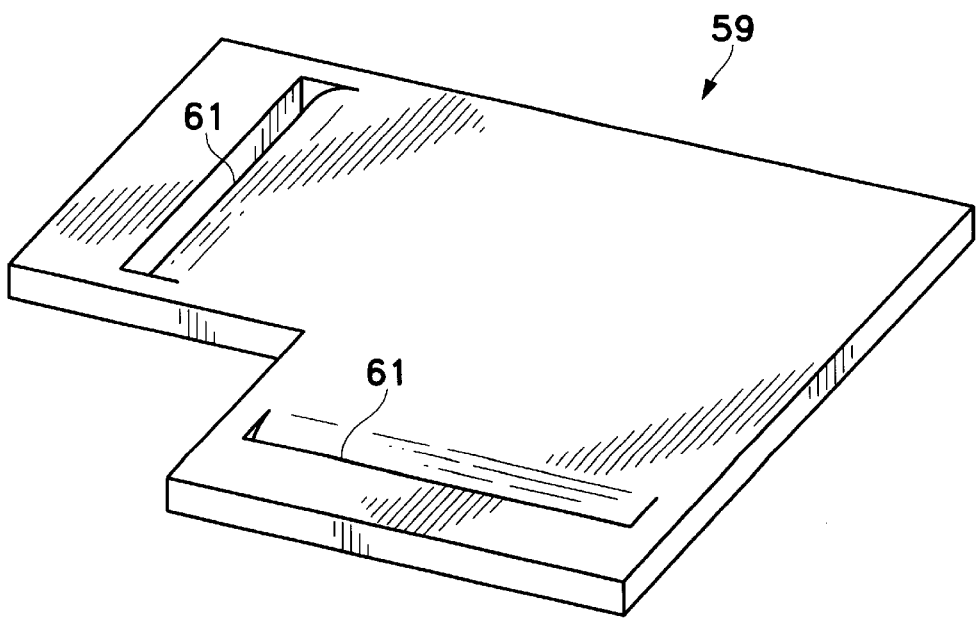
FIG. 5 shows the mold cover for the mold shown in FIG. 4.

The mold cover, which is essentially a mirror image of the mold 45, is shown in FIG. 5. The mold cover 59 has recesses 61 which, when the mold cover is attached to the mold 45, allows the molding material to flow over the tops of the terminator blocks thereby completing the four-sided anchoring of the terminator blocks within the matrix.

The mold 45 and the mold cover 59 can be held together with any of a wide variety of clamping devices well known in the art.

Figure 6:
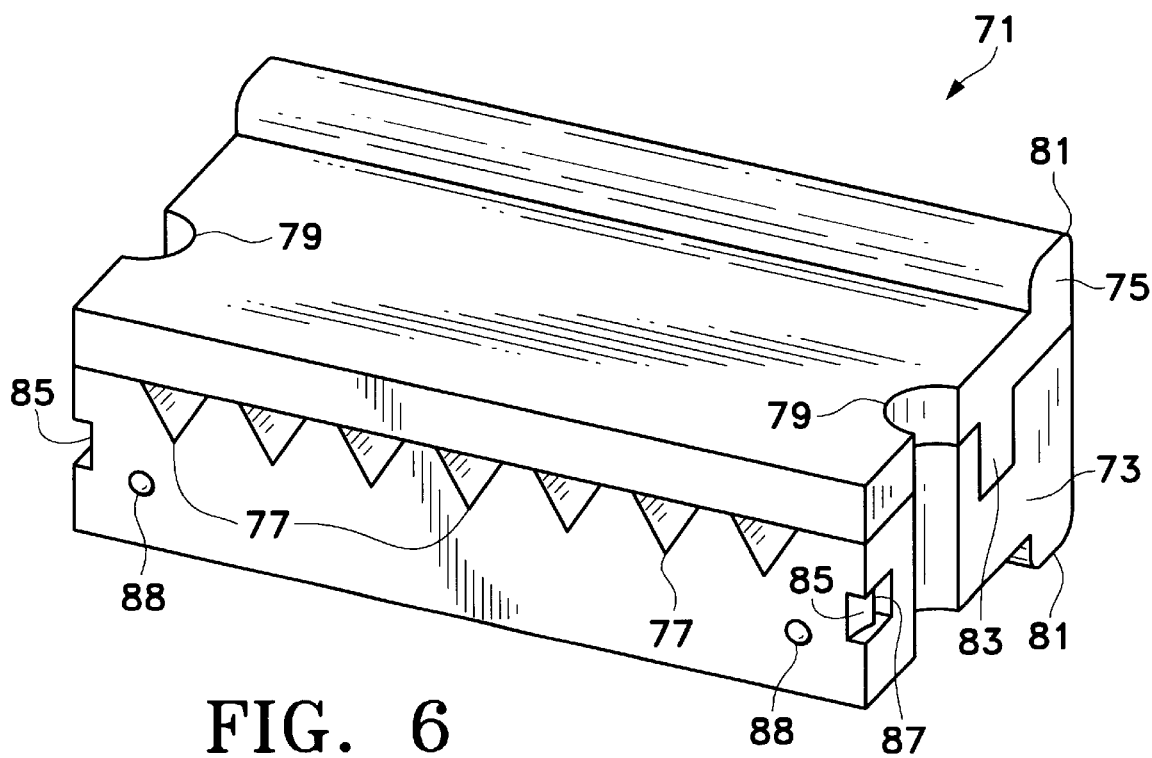
FIG. 6 shows the preferred embodiment of a terminator block.

Shown in FIG. 6 is an embodiment of the terminator block 71 which is comprised of a jacket holder 73 and a jacket clamp 75 made of a plastic material. Equally-spaced V-shaped grooves 77 for holding the jacketed fibers extend through the terminator block. The depth of the V-shaped grooves 77 is such that the jacketed fibers are held immoveable when the jacket holder 73 and the jacket clamp 75 are fastened together.

Other groove shapes can also be used. The only requirement is that the jacket clamp 75 and the grooves constrain the movement of the fibers after the fibers have been installed in the terminator block 71.

The preferred embodiment of the guide followers mentioned earlier in connection with the mold 45 is illustrated by the cylindrical recesses 79 which are designed to mate with the columns 51 of the mold 45 when the jacket holder 73 and the jacket clamp 75 are downwardly inserted into the mold 45. The guide structures in the mold 45 and the guide followers that are part of the terminator blocks 71 can have various shapes. The only requirement is the functional one that the guide followers guide a terminator block into its proper position in a mold and prevent any substantial relative motion between the terminator block and the mold during the molding operation.

The projections 81 at the back face of the terminator block 71 are enveloped in the molding material when the fiber connection matrix is molded, thereby providing a means for securing the terminator blocks within the fiber connection matrix. The projections 81 shown in the figure are ridges at the rear of the terminator block 71. Other types of projections can also be used. For example, a plurality of bumps on the surfaces or simply the small projections that result from roughened surfaces would serve to anchor the terminator blocks within the matrix.

The jacket holder 73 and the jacket clamp 75 are held together by the two latches 83 at the ends of the terminator block 71. Generally, a latch consists of two members which become attached to each other as a result of an appropriate manipulation. A latch may consist of a bar which can be caused to enter a hole, groove, or recess. It may be a loop which can be caused to engage a catch. There are latches that require the user to directly engage the members, and there are latches where the member automatically engage when the objects to which the latch members are attached are brought together. Any of these latches could be used in holding the jacket holder 73 and the jacket clamp 75 together.

Figure 7:
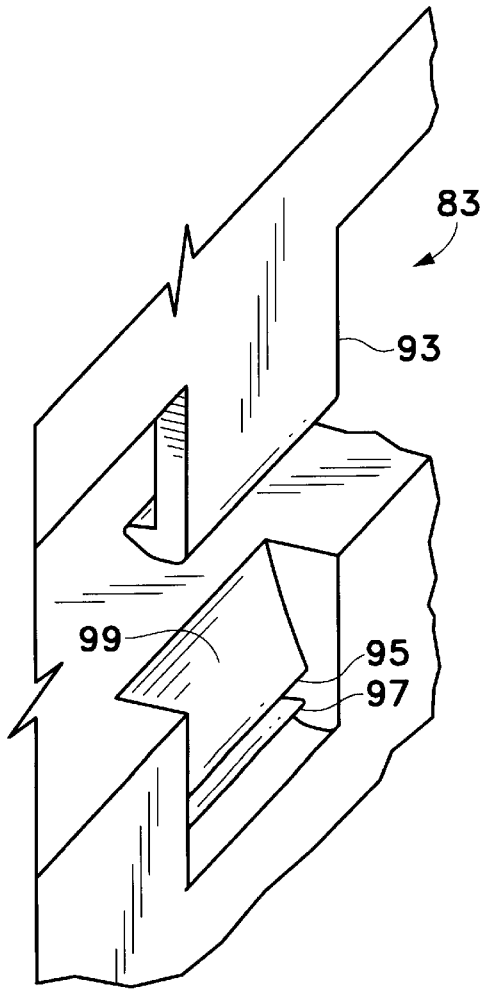
FIG. 7 shows the details of a two-position latch.

The preferred embodiment of the latches 83 is shown in FIG. 7. It consists of a hook 93 that is part of the jacket clamp 75 and steps 95 and 97 in channel 99 which are part of the jacket holder 73. After the jacket holder 73 is placed in the mold 45, the jacket clamp 75 is brought together with the jacket holder 73, and the hooks 93 on each end of the jacket clamp 75 enter the associated channels 99 and initially engage steps 95. The jacket holder 73 and the jacket clamp 75 are separated sufficiently to allow the jacketed fibers to be threaded through the grooves of the jacket holder 73 but are not so far apart as to allow the jacketed fibers to escape from their grooves. When all of the jacketed fibers have been inserted into their grooves, the jacket clamp 75 and the jacket holder 73 are further pushed together, thereby causing the hooks 93 to engage steps 97 and cause the jacketed fibers to be clamped between the jacket holder 73 and the jacket clamp 75.

The jacket holder 73 and the jacket clamp 75 can also be attached to each other using an adhesive rather than latches.

When latches are used, the latches themselves automatically align the jacket clamp 75 with the jacket holder 73 when the two parts are brought together. If an adhesive is used to attach the two parts to each other, alignment features should be provided on the jacket holder 73 and the jacket clamp 75 so that the parts are properly aligned when they are fastened together.

When both terminator blocks 71 have been installed in the mold 45 and the jacketed fibers have been threaded through the grooves 77 and clamped, the mold cover 59 can be attached to the mold 45 whereby securing the terminator blocks between the mold 45 and the mold cover 59. The fiber connection matrix is then formed by injecting the molding material into the mold.

When the fiber connection matrix is removed from the mold after curing, the jackets are removed from the fiber end portions extending beyond the terminator block 71, preferably by immersing the fiber ends in a liquid reagent to which the terminator block 71 is impervious. Liquid reagents which can be used to chemically remove the jackets from optical fibers without affecting plastic or other materials that might be used in fabricating terminator blocks are well known in the art.

After the jackets have been removed, the bare glass fibers protruding from the terminator blocks 71 are cleaved at a specified distance from the front faces of the terminator blocks. A terminator block 71 is placed in a jig, and a diamond blade is used to score the fibers. A striker plate is then used to strike the fibers at the scorings, thereby cleaving the fibers.

The optical fibers connecting to the optical components are clamped in the terminal blocks 71, the jackets are removed from the portions of the jacketed fibers protruding from the terminal blocks, and the bare optical fibers are cleaved in essentially the same manner as the optical fibers in the fiber connection matrix.

After the fibers protruding from each terminator block 71 have been cleaved, the fiber connection matrix is bent into the three-dimensional form shown in FIG. 3 for connection to the optical components.

Figure 8:
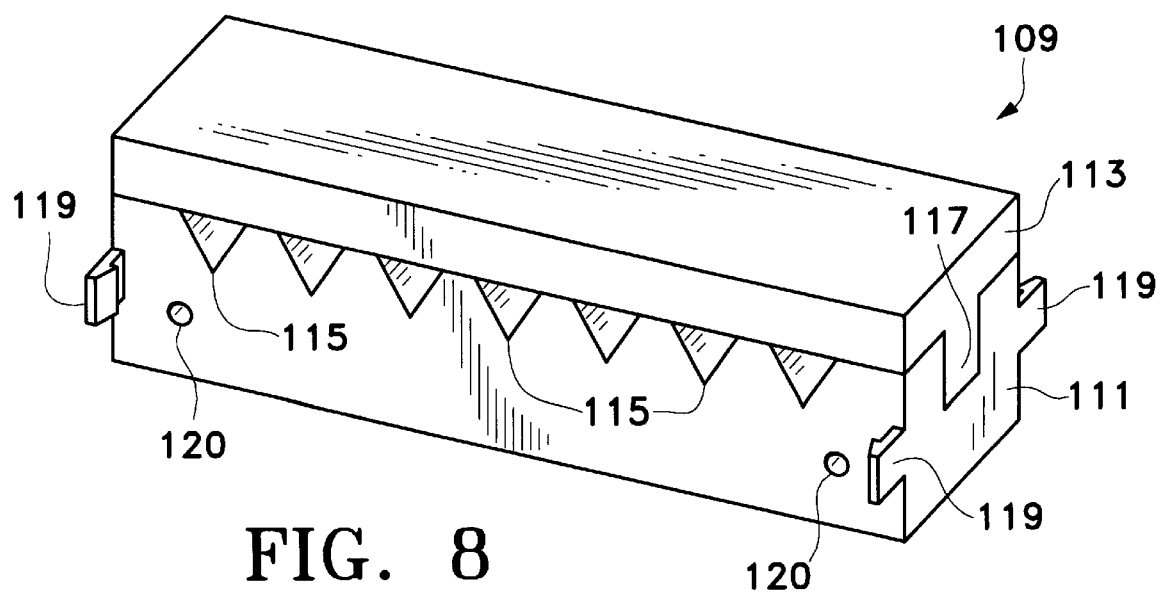
FIG. 8 shows the preferred embodiment of a connector block.

The connector block 109 shown in FIG. 8 is used to connect terminator blocks. The connector block 109 consists of the fiber holder 111 and the fiber clamp 113. The V-shaped grooves 115 extend all the way through the connector block 109. The depth of the V-shaped grooves 115 in the fiber holder 111 is such that the bare fibers are held securely when the fiber clamp 113 is fastened to the fiber holder 111. The fiber clamp 113 is fastened to the fiber holder 111 by means of two latches 117 on the ends of the connector block 109 such as the one shown in FIG. 7. Here also, many other types of latches can be used in fastening the fiber clamp 113 to the fiber holder 111.

The fiber holder 111 is sandwiched between and attached with four latches to the two opposing terminal blocks which clamp the fibers from the fiber connection matrix and the optical components. The thickness of the connector block 109 (the length of the grooves 115) is large enough to permit the incorporation of the latches 117 within the structure of the connector block. The lengths of the optical fibers protruding from the terminal blocks 71 are no greater than half the thickness of the connector block 109.

The hooks 119 of the latches are part of the fiber holder 111 and the channels 85, each with only one step 87, are part of the jacket holder 73 (see FIG. 6). The fiber holder 111 is brought together with a terminal block 71 with the lower horizontal surfaces of the hooks 119 in contact with the lower horizontal surfaces of the channels 85. When this procedure is followed, the optical fibers protruding from the grooves 77 of the terminal block 71 clear the sides of the grooves 115 of the fiber holder 111 by an amount no greater than about half the diameter of the bare fibers. When the hooks 119 are about to engage the steps 87, the two hemispherical projections 88 on the jacket holder 73 engage the two hemispherical dimples 120 on the fiber holder 111 and bring the jacket holder 73 into exact alignment with the fiber holder 111 when the hooks 119 actually engage the steps 87. This final exact alignment causes the optical fibers protruding from the terminal block 71 to rest in the grooves 115 in contact with the groove sides.

After the terminator blocks 71 are attached to the fiber holder 111, the fiber ends can be connected by using an adhesive or gel that has an index of refraction that matches that of the fibers. The optical junctions thus formed provide a low-loss light path between the fiber pairs that reside in the grooves.

Protection of the optical junctions is provided by the fiber clamp 113 which attaches to the fiber holder 111 by means of the latches 117. The fiber clamp 113 can also be attached to the fiber holder 111 with an adhesive rather than latches. If the fiber ends are connected using a relatively incompressible adhesive, a recess should be incorporated in the surface of the fiber clamp 113 that mates with the fiber holder 111 to allow space for the optical junctions.

The fiber ends can also be connected by using a fusion splicing technique. The use of fusion splicing would require a modified connector block providing greater accessibility to the fiber ends.

The grooves in the jacket holder 73 and the grooves in the fiber holder 111 should be aligned to within one $\mu$m when the two parts are joined together. This level of precision can be attained by micromachining the grooves and alignment features in single-crystal silicon, as described by Kurt E. Petersen, *Silicon as a Mechanical Material*, Proceedings of the IEEE, Vol. 70, No. 5, p. 420, May, 1982, and using the micromachined silicon as a matrix in molding the jacket holder 73 and the fiber holder 111. The fabrication tolerances for the jacket holder 73 and the fiber holder 111 can be relaxed somewhat by using thermally-expanded core fibers as described by Shiraishi, Yanagi, and Kawakami, *Light-Propagation Characteristics in Thermally Diffused Expanded Core Fibers*, J. Lightwave Technology, Vol. 11, No. 10, p. 1584, 1993.

What is claimed is:

1. Optical connection apparatus comprising:
   one or more terminator blocks for receiving and holding a plurality of jacketed optical fibers in a planar array parallel to a fiber reference line fixed with respect to each of the one or more terminator blocks, each terminator block having a front surface normal to the fiber reference line, one or more alignment features being incorporated in the front surface to permit the alignment of the terminator block with a mating device when a mating surface of the mating device is brought in contact with the front surface of the terminator block, the mating device having alignment features incorporated in the mating surface congruent with the alignment features of the terminator block.

2. The optical connection apparatus of claim 1 wherein each terminator block comprises:
   a jacket holder having a front surface, a rear surface, and a groove surface normal to the front surface and the rear surface, the groove surface having a plurality of grooves extending from the front surface to the rear surface, all of the grooves being identical in shape and size, the grooves being dimensioned to receive a plurality of jacketed optical fibers;
   a jacket clamp for clamping a plurality of jacketed optical fibers in the plurality of grooves of a jacket holder, the jacket clamp having a clamping surface which opposes the groove surface of the jacket holder, any portion of the clamping surface that contacts a jacketed optical fiber being fixed with respect to any other portion of the clamping surface that contacts a jacketed optical fiber.

3. The optical connection apparatus of claim 2 wherein the one or more jacket holders and jacket clamps are used with a mold having one or more guide structures for use in guiding each of the one or more jacket holders and jacket clamps into the mold, the jacket holder and/or jacket clamp having one or more guide followers which engage and follow one or more of the guide structures of the mold when the jacket holder and the jacket clamp are inserted into the mold.

4. The optical connection apparatus of claim 2 wherein a jacket clamp is attachable to a jacket holder with one or more latches.

5. The optical connection apparatus of claim 4 wherein a jacket clamp can be latched to a jacket holder in a first and a second position, the jacket clamp latched in the first position permitting a plurality of optical fibers to be threaded through the grooves of the jacket holder, the jacket clamp latched in the second position clamping the optical fibers in the grooves.

6. A method for using the apparatus of claim 5 comprising the steps:
latching one or more jacket clamps and jacket holders together, each jacket clamp being latched to a jacket holder in the first position;
threading the end portions of a plurality of jacketed fibers through the grooves of the one or more jacket holders;
clamping the jacketed fibers in the grooves of the one or more jacket holders by latching the jacket clamps to the jacket holders in the second position.

7. A method for using the apparatus of claim 2 comprising the steps:
placing the end portions of a plurality of jacketed fibers in the grooves of one or more jacket holders, the ends of the end portions extending beyond the grooves;
clamping the jacketed fibers in the grooves of the one or more jacket holders using one or more jacket clamps.

8. The optical connection apparatus of claim 1 wherein the one or more terminator blocks are intended to be part of a matrix, one or more of the external surfaces of each of the one or more terminator blocks having one or more projections which serve to anchor the terminator block within a matrix that encloses a portion of the terminator block, the one or more projections being manifested for each terminator block in the contour of the intersection of the terminator block and at least one plane parallel to the fiber reference line.

9. The optical connection apparatus of claim 1 wherein the one or more terminator blocks are intended for use with a mold having one or more guide structures for use in guiding each of the one or more terminator blocks into the mold, each terminator block having one or more guide followers which engage and follow the one or more guide structures of the mold when the terminator block is inserted into the mold, the guide followers being manifested in the contour of the intersection of the terminator block and at least one plane parallel to the fiber reference line.

10. The optical connection apparatus of claim 9 further comprising:
a mold having one or more guide structures for use in guiding each of the one or more terminator blocks into the mold.

11. The optical connection apparatus of claim 10 further comprising:
a mold cover, each of the one or more terminator blocks being held immoveable within the mold by the mold, the mold cover, the one or more guide structures, and the one or more guide followers when the mold cover is placed on the mold.

12. A method for using the apparatus of claim 11 comprising the steps:
obtaining a plurality of jacketed optical fiber segments of predetermined lengths;
inserting one or more jacket holders in the mold;
placing the plurality of optical fiber segments in the mold;
placing the end portions of the plurality of optical fiber segments in the grooves of the one or more jacket holders;
inserting a jacket clamp over each of the one or more jacket holders in the mold;
attaching each jacket clamp to its associated jacket holder thereby clamping the jacketed fibers in the grooves of the one or more jacket holders;
attaching a mold cover to the mold;
injecting a molding material into the mold;
curing the molding material in the mold thereby forming a fiber connection matrix; removing the fiber connection matrix from the mold.

13. A method for using the apparatus of claim 10 comprising the steps:
obtaining a plurality of jacketed optical fiber segments of predetermined lengths;
inserting one or more jacket holders in the mold;
placing the end portions of the plurality of optical fiber segments in the grooves of the one or more jacket holders;
inserting a jacket clamp over each of the one or more jacket holders in the mold;
attaching each jacket clamp to its associated jacket holder thereby clamping the jacketed fibers in the grooves of the one or more jacket holders.

14. The method of claim 13 further comprising the steps:
pouring a molding material into the mold;
curing the molding material in the mold thereby forming a fiber connection matrix;
removing the fiber connection matrix from the mold.

15. A method for using the apparatus of claim 10 comprising the steps:
obtaining a plurality of jacketed optical fiber segments of predetermined lengths;
placing the end portions of the plurality of optical fiber segments in the grooves of the one or more jacket holders;
assembling one or more terminator blocks by attaching each jacket clamp to its associated jacket holder thereby clamping the jacketed fibers in the grooves of the one or more jacket holders;
inserting the one or more terminator blocks and the plurality of optical fiber segments being held by the one or more terminator blocks in the mold.

16. The optical connection apparatus of claim 1 wherein a terminator block is attachable to a mating device by means of one or more latches, a latch consisting of two members which engage when latching occurs, the terminator block including one of the members of each of the one or more latches, the engagement of the one or more latches causing the alignment features of the terminator block to be superimposed on the alignment features of the mating device.

17. The optical connection apparatus of claim 1 further comprising:

a plurality of jacketed optical fibers, the end portions of the jacketed optical fibers being held by the one or more terminator blocks.

18. The optical connection apparatus of claim 17 further comprising:

a matrix which encloses the jacketed fibers.

19. The optical connection apparatus of claim 18 wherein the matrix also encloses portions of the terminator blocks.

20. The optical connection apparatus of claim 1 further comprising:

one or more connector blocks for holding a plurality of bare optical fibers, a connector block being attachable to two terminator blocks, the connector block holding the bare optical fibers protruding from a terminator block when the connector block is attached to the terminator block and bare optical fibers are protruding from the terminator block.

21. The optical connection apparatus of claim 20 wherein each connector block comprises:

a fiber holder having a surface with a plurality of grooves, the grooves being dimensioned to receive a plurality of bare optical fibers.

22. The optical connection apparatus of claim 21 wherein each connector block further comprises:

a fiber clamp for clamping a plurality of bare optical fibers in the plurality of grooves of a fiber holder.

23. The optical connection apparatus of claim 22 wherein a fiber clamp is attachable to a fiber holder with one or more latches.

24. The optical connection apparatus of claim 21 wherein a fiber holder is attachable to a terminator block by means of one or more latches, a latch consisting of two members which engage when latching occurs, the fiber holder having one of the two members of each of the one or more latches, the terminator block having the other of the two members of each of the one or more latches.

25. A method for using the apparatus of claim 21 comprising the steps:

installing the end portions of a plurality of jacketed fibers in two terminator blocks with the lengths of the end portions protruding from the terminator blocks being greater than one-half the thickness of the fiber holder;

removing the jackets from the ends of the fibers protruding from the terminator blocks;

cleaving the bare fibers protruding from the terminator blocks at a distance from the terminator blocks less than one-half the thickness of the fiber holder;

attaching the fiber holder to the two terminator blocks, the bare fibers protruding from the terminator blocks resting in the grooves of the fiber holder.

26. The method of claim 25 further comprising the step:

creating an optical junction between the ends of the optical fibers in each groove of the fiber holder.

27. A method for using the apparatus of claim 22 comprising the steps:

installing the end portions of a plurality of jacketed fibers in two terminator blocks with the lengths of the end portions protruding from the terminator blocks being greater than one-half the thickness of the fiber holder;

removing the jackets from the ends of the fibers protruding from the terminator blocks;

cleaving the bare fibers protruding from the terminator blocks at a distance from the terminator blocks less than one-half the thickness of the fiber holder;

attaching the fiber holder to the two terminator blocks, the bare fibers protruding from the terminator blocks resting in the grooves of the fiber holder.

28. The method of claim 27 further comprising the step:

creating an optical junction between the ends of the optical fibers in each groove of the fiber holder.

29. The method of claim 28 further comprising the step:

attaching a fiber clamp to the fiber holder.

30. Optical connection apparatus comprising:

one or more connector blocks for holding two sets of bare optical fibers in end-to-end collinear alignment in a planar array parallel to a fiber reference line fixed with respect to each of the one or more connector blocks, each connector block having two parallel end surfaces normal to the fiber reference line, one or more alignment features being incorporated in each end surface to permit the alignment of the connector block with a mating device when a mating surface of the mating device is brought in contact with an end surface of the connector block, the mating device having alignment features incorporated in the mating surface congruent with the alignment features of the connector block.

31. The optical connection apparatus of claim 30 wherein each set of optical fibers is being held in a terminator block, each connector block being attachable to two terminal blocks.

32. The optical connection apparatus of claim 31 wherein a connector block is attachable to a terminator block by means of one or more latches, a latch consisting of two members which engage when latching occurs, the fiber holder having one of the two members of each of the one or more latches, the terminator block having the other of the two members of each of the one or more latches.

33. The optical connection apparatus of claim 30 wherein each connector block comprises:

a fiber holder having a surface with a plurality of grooves, the grooves being dimensioned to receive a plurality of bare optical fibers, each groove extending from one end of the fiber holder to the other end in a continuous fashion without interruption.

34. The optical connection apparatus of claim 30 wherein each connector block comprises:

a fiber holder having a surface with a plurality of grooves, the grooves being dimensioned to receive a plurality of bare optical fibers;

a fiber clamp for clamping a plurality of bare optical fibers in the plurality of grooves of a fiber holder, the fiber clamp being without passageways that extend through the fiber clamp.

35. The optical connection apparatus of claim 30 wherein each connector block comprises:

a fiber holder having a surface with a plurality of grooves, the grooves being dimensioned to receive a plurality of bare optical fibers;

a fiber clamp for clamping a plurality of bare optical fibers in the plurality of grooves of a fiber holder, the fiber clamp being attachable to a fiber holder with one or more latches, the latches physically preventing relative movement between the fiber clamp and the fiber holder in all directions.

* * * * *